UNITED STATES PATENT OFFICE.

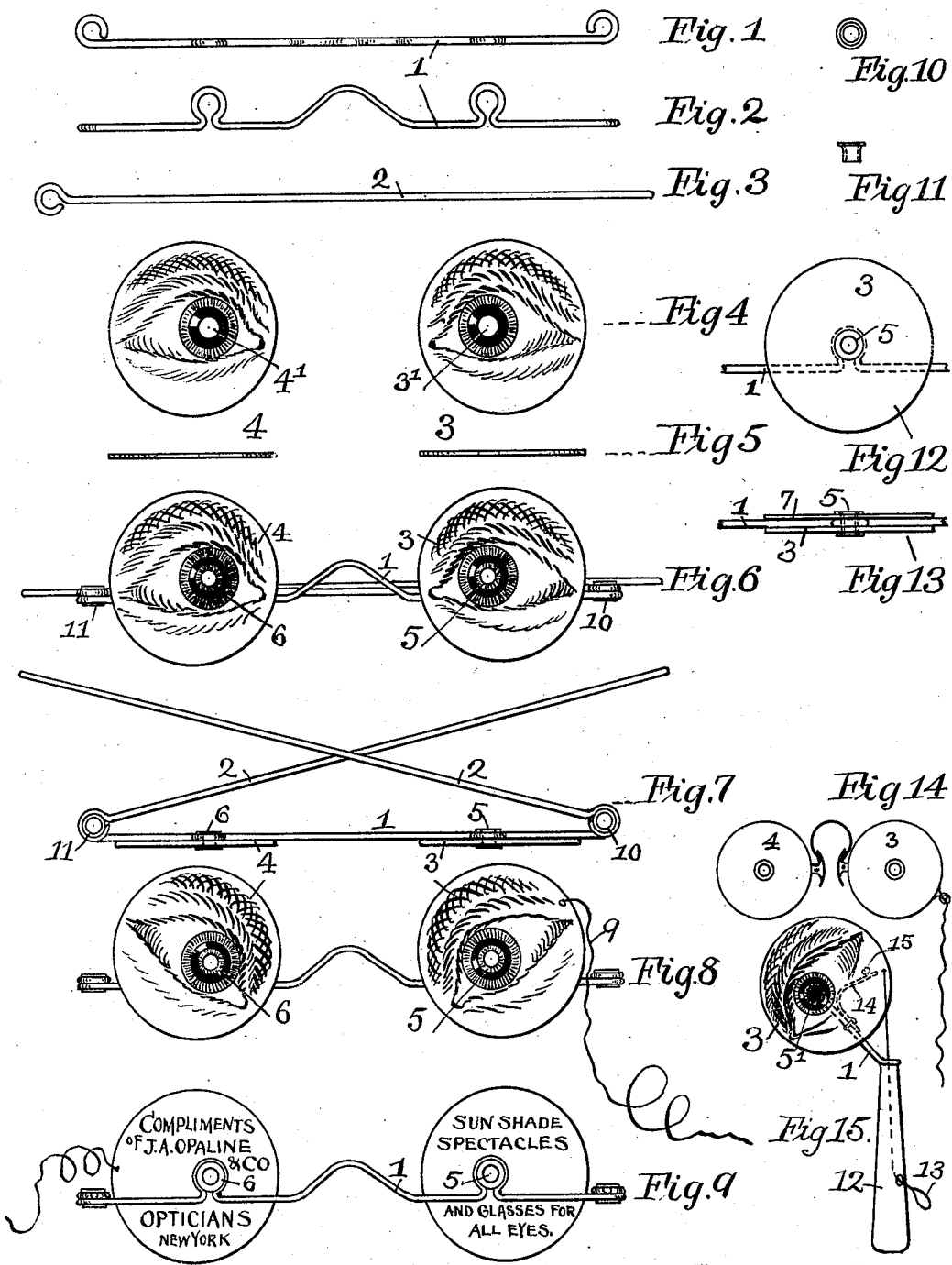

WILLIAM A. LORENZ, OF HARTFORD, CONNECTICUT, ASSIGNOR OF ONE-HALF TO W. H. HONISS, OF SAME PLACE.

TOY SPECTACLES.

SPECIFICATION forming part of Letters Patent No. 560,418, dated May 19, 1896.

Application filed August 1, 1895. Serial No. 557,858. (No model.)

*To all whom it may concern:*

Be it known that I, WILLIAM A. LORENZ, a citizen of the United States, residing at Hartford, in the county of Hartford and State of Connecticut, have invented certain new and useful Improvements in Toy Spectacles, of which the following is a full, clear, and exact specification.

The object of this invention is an eyeshade or a pair of spectacles which may be used as a protection for the eyes against strong sunlight, or which may be used for advertising purposes, or as an amusing toy. For this purpose I employ a frame somewhat similar to those now used for eyeglasses or bow-spectacles, excepting that the loops or openings corresponding to those made to receive the glass lenses in the ordinary spectacles are for my purpose made much smaller, and are preferably made circular instead of oval, as is the usual practice. The size of the opening is adapted to engage the outside of an ordinary-sized eyelet, similar to those used for fastening papers together, which is attached to disks of paper or cardboard, or other material having suitable lightness and strength for the purposes to be served. For use as sunshades these disks may be firmly attached to the frames by means of their respective eyelets, or otherwise, or those eyelets, firmly attached to the disks, may be loosely engaged by the above-mentioned loops in the frames, so as to be capable of being turned therein, the loops being so formed as to exert a slight pressure upon the eyelets in case it is desired to retain them by friction in any position to which they may be turned. The fronts of these disks may have upon them representations of human or other eyes, either of natural or exaggerated or distorted appearance, and the members of the same pair may be of different sizes or colors, or may represent the eyes of different animals in countless ways, according to the fancy, so as to produce absurd and grotesque effects, which may be still further heightened by positioning the eyes at different angles or by turning them while in position upon the wearer by means such as hereinafter described. For advertising purposes one side of the disks can be used while the other can be left blank, the bows being reversible, so as to present either side outward.

Figures 1 and 2 of the drawings are a plan and a front view, respectively, of a frame 1 adapted to be used as bow-spectacles. Fig. 3 represents the bow 2, of which two are used. Figs. 4 and 5 are front and plan views, respectively, of a pair of disks 3 and 4, provided with the holes 3' and 4', respectively, and having representations of eyes thereon. Figs. 6 and 7 are front and plan views, respectively, of the completed bow-spectacles, the frame 1 having the bows 2 2 attached at pivots 10 and 11, respectively. In Fig. 6 the eyes are shown alined in their natural position, while Fig. 8 represents the same spectacles with the eye-disks slightly turned on their central pivots 5 and 6. Fig. 9 represents the reversed side of a pair of these spectacles with a specimen advertisement printed thereon. Figs. 10 and 11 represent two views of an eyelet such as I preferably employ for attaching the disks to the frames. Figs. 12 and 13 represent front and plan views, respectively, of a portion of the frame 1, having the disks 3 and 7 mounted one on either side thereof. Fig. 14 shows in reduced scale a modification of this invention in the form of a pince-nez frame with the disks attached thereto. Fig. 15 represents still another modification of this invention, a single eyepiece attached to a lorgnette-handle 12 with a string 13 fastened to the eyepiece.

These spectacles may have their bows 2 curved or hooked in the usual way. These bows may be attached to the frame by means of eyelets, such as that shown in Figs. 10 and 11, forming the pivots 10 and 11, and the eyeshades or disks may be attached by similar eyelets to form the pivots 5 and 6. Any other suitable means may be employed by which the same results may be obtained—namely, to so attach the respective parts as to have them securely yet rotatably fastened.

The lorgnette shown in Fig. 15 is provided with an eyepiece 3, which in this instance is pivoted on the frame 1 by means of a solid rivet 5'. To the frame 1 is also attached the spring 14, which bears against a small pin 15 and serves to hold the eyepiece 3 in an upward angular position. A string 13, attached at or near the outer edge of the eyepiece 3, passes downwardly at the side of or through the handle 12, and is provided with a loop or button, which may be passed over or between the fingers of the hand which holds the handle 12. In use this eyepiece may be held to the eye and an oscillating motion imparted to the eyepiece by the alternate action of the string 13 and the spring 14. One or both of the disks of the spectacles (shown in Figs. 8 and 9) may be similarly fitted with a spring and operated as herein described, or the spring may be omitted and only the string 9 employed, or the disks themselves may be turned by a touch of the fingers while pretending to adjust the bows and frames to the head. A skilful manipulator can thus produce effects amusing, grotesque, and startling to an almost unlimited extent.

The apertures through the central pivots of the disks are not considered an indispensable feature of this invention, especially when it is used as a toy; but they are considered to be highly advantageous, and when employed should be so located as to come central with the eyes and enable the user to watch, unsuspected, the efforts produced while manipulating the shades for the amusement or otherwise of spectators. When the spectacles are employed in the capacity of shades, these apertures enable the wearer to see clearly without admitting sufficient light to be painful or injurious to weak or sensitive eyes. Furthermore, the wearer is enabled to see all things in their natural colors, an advantage denied in the use of smoked or colored glasses. The front or outer sides of the disks may be of a flesh tint or of any suitable color or appearance adapted to harmonize with the complexion or features of the wearer. The apertures in the disks may, if adjusted to the centers of the eyes, be made very small, thus excluding the light to any desired degree.

The eye-shades, which are herein shown to be flat circular disks, may in point of fact be made of any desired outline, and they may also be cupped or dished, as the fancy or as convenience may dictate. The representations of eyes may be printed or lithographed thereon, or the disks may be embossed so as to raise the represented eyeball and its surroundings into true contour.

I claim as my invention—

1. In combination with a suitably-adapted frame, one or more disks adapted to substantially conceal the real eye or eyes respectively of the wearer, each disk having thereon an artificial representation of an eye, and being movably attached to the frame for the specified purpose of disguising the wearer's appearance, substantially as described.

2. The combination of a frame, with one or more eye shades or disks attached thereto, each disk having an aperture located in suitable relation to the eye or eyes for the purpose of vision, and each disk being capable of movement around its aperture, substantially as described.

3. In combination with a suitably-adapted frame, one or more eye-shades adapted to substantially conceal the real eye or eyes respectively of the wearer, each shade having thereon an artificial representation of an eye, and being attached to the frame by a pivotal connection at or near the center of the disk, enabling it to be rotated to different positions to produce grotesque effects, substantially as described.

4. The combination of a frame, with one or more eye shades or disks pivotally attached thereto, each disk having an aperture at or near its pivotal center for the purpose of vision, being capable of motion around that pivotal center, and having some representation thereon, substantially as described.

WILLIAM A. LORENZ.

Witnesses:
JENNIE NELLIS,
W. H. HONISS.